United States Patent [19]

Kuo et al.

[11] Patent Number: 5,576,930

[45] Date of Patent: Nov. 19, 1996

[54] RACK PAIR MOUNTING SPEAKERS AND SYSTEM BOARD IN A MONITOR OF A COMPUTER SYSTEM

[75] Inventors: Lung-Chih Kuo; Sam Lin, both of Taoyuan, Taiwan

[73] Assignee: Delta Electronics, Inc., Taoyuan, Taiwan

[21] Appl. No.: 522,937

[22] Filed: Sep. 1, 1995

[51] Int. Cl.$^6$ ................................................ H02B 1/052
[52] U.S. Cl. ..................... 361/683; 361/725; 361/756; 348/787
[58] Field of Search ........................ 361/679–837; 348/825–843, 787, 789, 794; 312/7.2, 223.1, 223.2; 248/917–923

[56] References Cited

U.S. PATENT DOCUMENTS

| | | | |
|---|---|---|---|
| 4,048,669 | 9/1977 | Bowler et al. | 361/725 |
| 4,644,408 | 2/1987 | Coleman | 358/254 |
| 5,041,944 | 8/1991 | Campisi | 361/683 |
| 5,448,495 | 9/1995 | Liu | 361/683 |

Primary Examiner—Leo P. Picard
Assistant Examiner—Lynn D. Feild
Attorney, Agent, or Firm—Bacon & Thomas

[57] ABSTRACT

Disclosed is a rack pair for mounting speakers and system board in a monitor of a computer system being mounted behind a front frame of the monitor at two lower or upper corners thereof so that a distance left between the rack pair is substantially equal to a width of a system board disposed inside the monitor. The rack pair are characterized in that the rack each is formed at an inner side with a longitudinal groove which has a width slightly larger than a thickness of the system board to clamp the system board between the rack pair, that the rack each is provided with a connecting device extending toward a display tube in the monitor to connect a speaker cabinet member, and that a locater is provided at a lower portion of each rack for engaging with a fixing device provided behind the front frame of the monitor so that the rack pair for mounting speakers and system board can be firmly mounted in the monitor for the speakers to be mounted in the monitor together with the system board.

12 Claims, 4 Drawing Sheets

RACK PAIR MOUNTING SPEAKERS AND SYSTEM BOARD IN A MONITOR OF A COMPUTER SYSTEM

BACKGROUND OF THE INVENTION

1. Field of the Invention

The present invention relates to a rack pair for mounting speakers and system board in a monitor of a computer system, and more particularly to a mounting rack pair which associate speakers with a system board so that the speakers can be mounted together with the system board in a monitor.

2. Description of the Prior Art

A conventional monitor of a computer system provides only the function of displaying images. Speakers for audio purpose must be disposed externally and connected to the monitor by means of wires. This adversely affects the integrity of the whole computer system while the multiple wires tend to cause a disordered working environment.

Generally speaking, the disadvantages of the conventional monitor with externally connected speakers include:

1. Following an increasingly grown need of general consumers for a better combined audio-video effect provided by a monitor when using a computer, the externally disposed speakers are not able to satisfy such requirement.

2. The wires for connecting the external speakers to the monitor shall expose the connection thereof to the surroundings which has adverse influence on the whole beautiful appearance and integrity of the computer system.

It is therefore tried by the inventor to develop a speaker mounting rack pair for mounting speakers in a monitor to eliminate the above-mentioned disadvantages.

SUMMARY OF THE INVENTION

A primary object of the present invention is to provide a rack pair for mounting speakers and system board in a monitor. The rack pair according to the present invention enable the monitor of a computer system to accommodate the system board and the speakers at the same time and thereby to provide better and synchronous audio/video effect.

Another object of the present invention is to provide a rack pair for mounting speakers and system board in a monitor so that the monitor may be successfully connected with the system board and the speakers without the need of external wires, permitting the computer system to have more complete functions and simplified hardware structure which facilitates the transportation of the whole computer system.

BRIEF DESCRIPTION OF THE DRAWINGS

The above and other objects of the present invention and the detailed structure, features, and functions thereof can be best understood by referring to the following detailed description of the preferred embodiment and the accompanying drawings, wherein.

DETAILED DESCRIPTION OF THE PREFERRED EMBODIMENT

Figure 1:
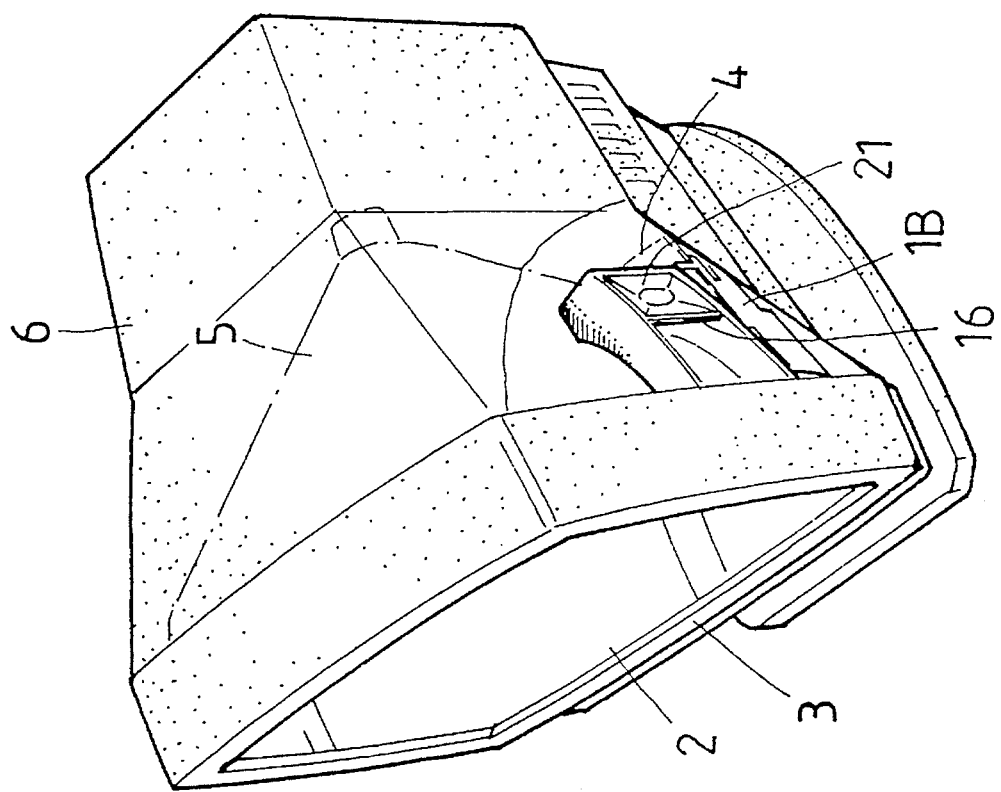
FIG. 1 is a perspective showing a monitor with the rack pair for mounting speakers and system board according to the present invention, wherein a part thereof is cut away to better show the mounting position of the rack pair.

Please refer to FIG. 1 in which a part is cut away to more clearly show a rack pair for mounting speakers and system board according to the present invention being mounted in a monitor 2. As shown in the drawings, a right rack 1A (not shown in FIG. 1) and a left rack 1B of the present invention are separately mounted in the monitor 2 near two lower corners behind a front frame 3 thereof, so that a system board 4 is held by the right and the left rack 1A, 1B to transversely extend therebetween. A speaker cabinet member 16 forming a part of each rack for mounting a speaker 21 thereto faces a side wall of a display tube 5 of the monitor 2. This arrangement allows the system board 4 and the speakers 21 to be fixedly mounted inside a rear housing 6 of the monitor 2.

Figure 2:
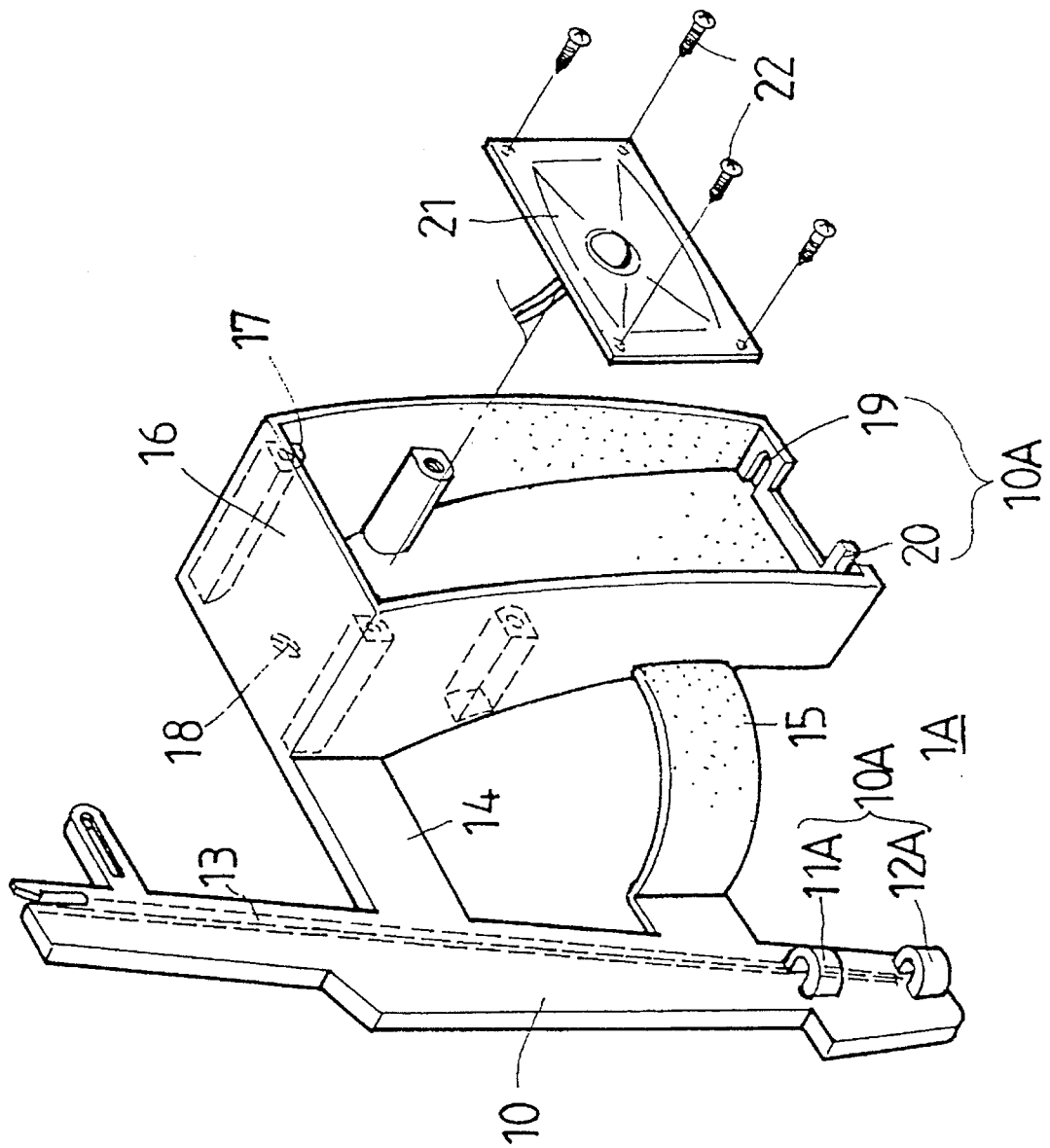
FIG. 2 is a perspective showing a right rack of the rack pair for mounting speakers and system board in a monitor according to the present invention.

Please refer to FIG. 2 which shows a right side rack 1A of the present invention. Since the right and the left side racks are identical in their structure, only the right side rack is described herein. As shown in FIG. 2, the rack 1A consists of a main frame 10 provided with locating means 10A, a straight connecting arms 14, a curved connecting arm 15, and a speaker cabinet member 16. The locating means 10A is located at an outer lower end of the main frame 10 and further includes a first sleeve member 11A and a second sleeve member 12A sequentially provided along a longitudinal axis of the main frame 10. The locating means 10A also includes means for fixing a speaker to the cabinet member 16 and will be described later.

The main frame 10 is formed with a longitudinally extended groove 13 at an inner side thereof. The groove 13 has a width slightly larger than a thickness of the system board 4 such that a lateral edge of the system board 4 can be retained by the groove 13 to allow the system board 4 to slidably move along the groove 13.

The straight connecting arm 14 extends between the main frame 10 and the cabinet member 16 at a height equal to a top of the cabinet member 16. The curved connecting arm 15 is located below and adequately spaced from the straight connecting arm 14 so that it extends from the main frame 10 to connect a lower portion of the cabinet member 16. The curved connecting arm 15 is so curved that it protrudes outward without interfering with the mounting of the display tube 5 in the monitor 2, allowing the main frame 10 to be fitly mounted behind the front frame 3 of the monitor 2 at a lower corner thereof.

The cabinet member 16 is provided with four internally threaded speaker mounting rods 17 projecting from an inner upper portion of the cabinet member 16. The speaker 21 is fixed to the cabinet member 16 by means of screws 22 screwed into the rods 17. A wire hole 18 is formed on the cabinet member 16 for wires connecting the speaker 21 to pass therethrough. Mounting holes 19, 20 formed at two lower corners of the cabinet member 16 constitute a part of the locating means 10A, allowing the cabinet member 16 to be screwed to a back side of the front frame 3. The cabinet member 16 has a curved back board serving as a sound guiding board 16A.

Figure 3A:
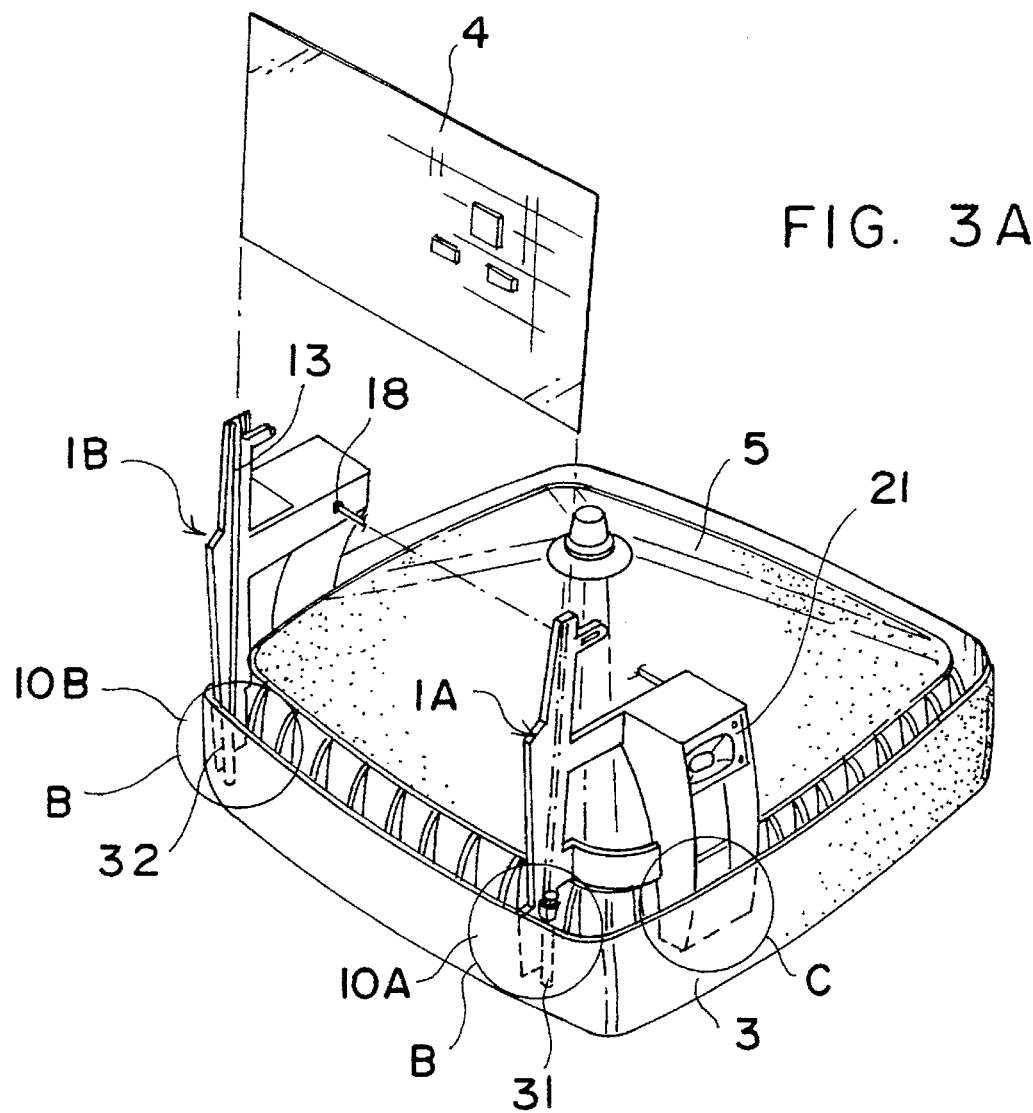
FIG. 3 is an exploded perspective showing the assembling of the present invention to a monitor.
Figure 3B:
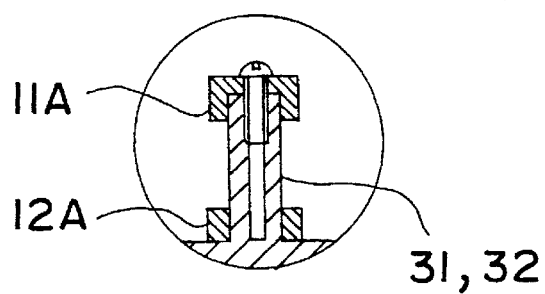
Figure 3C:
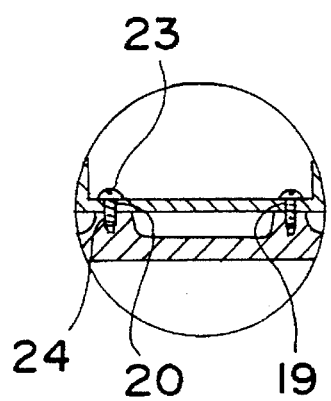

FIG. 3 illustrates the mounting of the rack 1A behind the front frame 3 of the monitor 2. As shown in FIG. 3, after the display tube 5 is connected to the front frame 3, dispose the right and the left rack 1A, 1B at two lower corners behind the front frame 3 with the first and the second sleeve members 11A, 12A and 11B, 12B of the locating means 10A, 10B, respectively, fixing around locating shafts 31, 32 separately formed near two lower corners of a back side of the front frame 3. Screws can be used to thread into the first sleeve members 11A, 11B to further fix the rack 1A, 1B in place. After the two racks 1A, 1B are mounted, a distance left between them plus the depth of the two grooves 13 formed on the main frames 10 shall be substantially equal to a width of the system board 4, allowing the system board 4 to be held between the two racks 1A, 1B and slidably move along the grooves 13. Moreover, screws 23 can be used to thread through the mounting holes 19, 20 provided at the lower portion of each cabinet member 16 into threaded holes 24 provided at a back side of the front frame 3 to firmly connect the whole racks 1A, 1B to the front frame 3.

Figure 4:
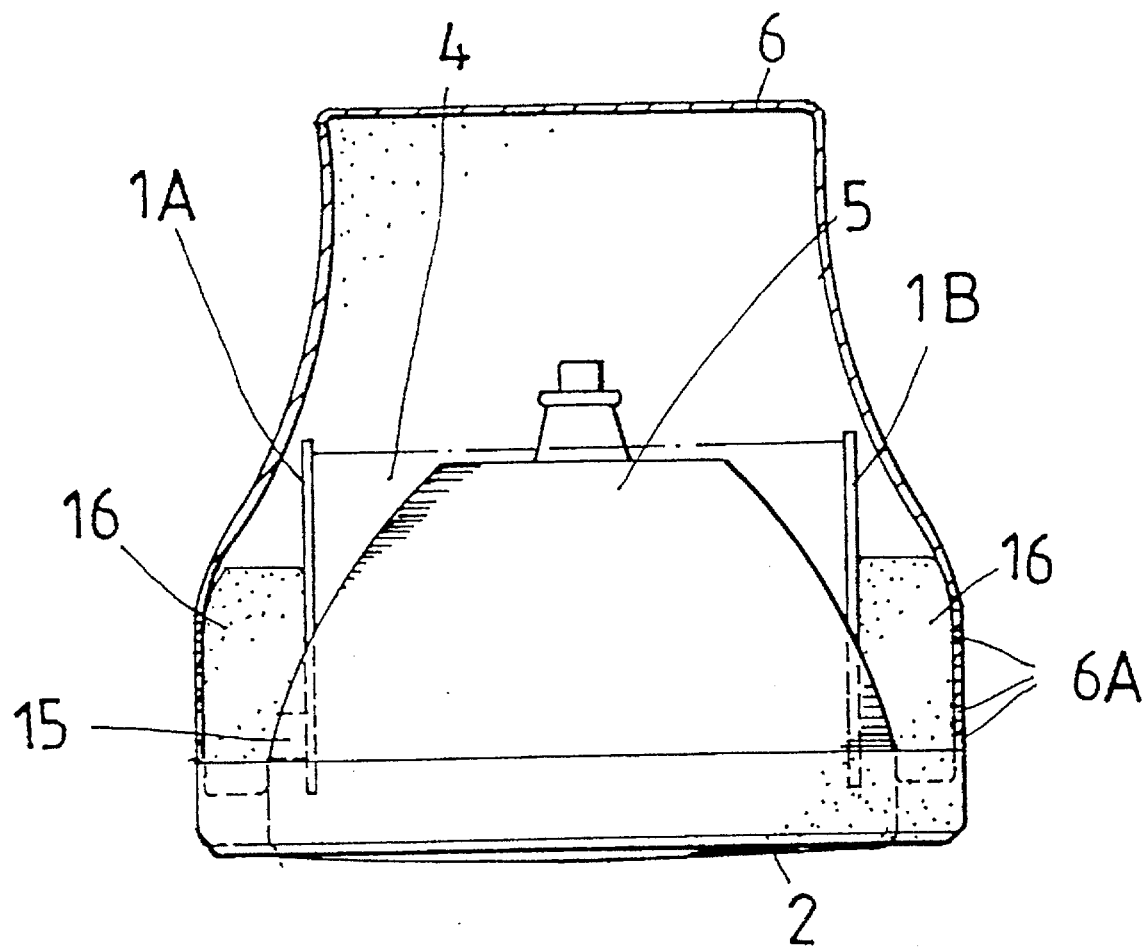
FIG. 4 is a cross-sectional view showing the rack pair of the present invention being mounted in a monitor at two sides thereof.

FIG. 4 is a cross section showing an assembled monitor with two racks 1A, 1B of the present invention mounted behind the front frame 3. From the figure, it can be clearly seen that the cabinet member 16 each has a front curve which fitly contacts with a curved inner wall of the rear housing 6 while the curved connecting arms 15 fitly clamp two rounded corners of the display tube 5 and portions of the back boards 16A of the speaker cabinet members 16 corresponding to the curved connecting arms 15 fitly contact with the display tube 5. With these fitly contacting and clamping relation between the rear housing 6 and the racks 1A, 1B, the whole racks 1A, 1B can be firmly mounted in the monitor 2. Sound holes 6A can be formed at positions corresponding to the curved sound guiding board 16A for sounds to emit therefrom.

With the above arrangements, the speakers can be directly mounted in the monitor of a computer system to work with the system board. The present invention can therefore effectively eliminate the disadvantages existed in the conventional monitor with externally connected speakers.

The above description and accompanying drawings are only used to illustrate a preferred embodiment of the present invention, not intended to limit the scope thereof. Many changes and modifications of the embodiment can be made without departing from the spirit of the present invention.

What is claimed is:

1. A pair of racks for mounting speakers and a system board in a monitor having a front frame a rear housing with a display tube, a plurality of speakers and a system board disposed inside said monitor, each rack comprising: a main frame having an inner side with a longitudinal groove having a width larger than a thickness of said system board to mount said system board in the longitudinal grooves between said pair of racks; speaker cabinet members having a speaker mounted therein; connecting means extending toward the display tube in said monitor to connect the speaker cabinet member to the main frame; and locating means on a lower portion of said front frame of said monitor engaging the locating means on each rack so that each of said racks are firmly mounted in said monitor for mounting speakers in said monitor together with said system board.

2. The pair of racks for mounting speakers and a system board in a monitor as claimed in claim 1, wherein said connecting means comprises an upper straight connecting arm and a lower curved connecting arm.

3. The pair of racks for mounting speakers and a system board in a monitor as claimed in claim 1, wherein said connecting means comprises a connecting plate for connecting said speaker cabinet member to said main frame.

4. The pair of racks for mounting speakers and a system board in a monitor as claimed in claim 2 wherein said locating means comprises: two sleeve members on a lower end of each of said main frames in alignment with each other; and mounting holes on a bottom end of each of said speaker cabinet members, said sleeve members and said mounting holes having internal threads for receiving screws therein.

5. A pair of racks for mounting speakers and a system board in a monitor as claimed in claim 2 wherein said locating means comprising locating flanges formed at lower ends of each of said main frame and each of said speaker cabinet members; and retaining means formed at said front frame of said monitor and located so as to engage said locating flanges.

6. The pair of racks for mounting speakers and a system board in a monitor as claimed in claim 2 wherein said locating means comprises positioning rings formed on a bottom surface of each of said main frames; and mounting holes provided in a bottom end of each of said speaker cabinet members.

7. The pair of racks for mounting speakers and a system board in a monitor as claimed in claim 2 wherein said locating means comprises: two axially aligned sleeve members on a lower end of each of said main frames, said sleeve members each having internal threads for screws to thread thereinto.

8. The pair of racks for mounting speakers and a system board in a monitor as claimed in claim 2, wherein said speaker cabinet members each comprise a front curved portion which is in contact with a curved inner wall of a rear housing of said monitor, wherein said lower curved connecting arms are located so as to clamp two rounded corners of said display tube, and said speaker cabinet members are in contact with sides of said display tube, whereby each of said racks is disposed between said rear housing and said display tube.

9. The pair of racks for mounting speakers and a system board in a monitor as claimed in claim 3 wherein said locating means comprises: two sleeve members on a lower end of each of said main frames in alignment with each other; and mounting holes on a bottom end of each of said speaker cabinet members, said sleeve members and said mounting holes having internal threads for receiving screws therein.

10. The pair of racks for mounting speakers and a system board in a monitor as claimed in claim 3 wherein said locating means comprising locating flanges formed at lower ends of each of said main frame and each of said speaker cabinet members; and retaining means formed at said front frame of said monitor and located so as to engage said locating flanges.

11. The pair of racks for mounting speakers and a system board in a monitor as claimed in claim 3 wherein said locating means comprises positioning rings formed on a bottom surface of each of said main frames; and mounting holes provided in a bottom end of each of said speaker cabinet members.

12. The pair of racks for mounting speakers and a system board in a monitor as claimed in claim 3 wherein said locating means comprises: two axially aligned sleeve members on a lower end of each of said main frames, said sleeve members each having internal threads for screws to thread thereinto.

* * * * *